May 29, 1962  E. N. SCHROEDER  3,036,776
RADAR DISPLAY SWEEP GENERATOR FOR CONVERTING
SLANT RANGE TO GROUND RANGE

Filed Dec. 26, 1957  2 Sheets-Sheet 1

INVENTOR
EUGENE N. SCHROEDER

Ralph R Barnard
ATTORNEY

May 29, 1962 E. N. SCHROEDER 3,036,776
RADAR DISPLAY SWEEP GENERATOR FOR CONVERTING
SLANT RANGE TO GROUND RANGE
Filed Dec. 26, 1957 2 Sheets-Sheet 2

United States Patent Office 3,036,776
Patented May 29, 1962

3,036,776
RADAR DISPLAY SWEEP GENERATOR FOR CONVERTING SLANT RANGE TO GROUND RANGE
Eugene N. Schroeder, Vestal, N.Y., assignor to International Business Machines Corporation, New York, N.Y., a corporation of New York
Filed Dec. 26, 1957, Ser. No. 705,358
10 Claims. (Cl. 235—191)

This invention relates to means for electronically solving a right triangle and more particularly to new and improved means for accurately deriving a solution commensurate with one side of a right triangle when the magnitude of both the hypotenuse and the other side are known.

It is an established mathematical principle that the relationship between the magnitudes of the base and the hypotenuse and altitude of a right triangle is hyperbolic in nature. One area where this mathematical principle is important is in the design of the presentation indicators usable with airborne radars. This is true by reason of the fact that in airborne radar systems used for both air navigation and bombing it is often essential that the relative ground position of targets or reference points be presented without scale distortions. As is well known, a common type of radar employs transmitted pulses of electromagnetic energy which are transmitted to and reradiated from targets and reference points at the speed of light in a manner so that the time elapse between the transmission and the receipt of the energy pulses provides information commensurate with the slant range to the target or reference point. In addition, the transmitting antenna may be rotated such that successive rangings are taken at different bearings.

Whenever it is desired that the radar indicator provide a composite presentation of these successive rangings with a map-like appearance, it is desirable that the distances between objects (targets and/or reference points) be a scalar representation of the corresponding distances separating these objects on the earth's surface. Inasmuch as the radar equipment is airborne and the distance traveled by the transmitted pulses may vary in accordance with the altitude of the aircraft mounting the radar, it is apparent that the ranges measured by the radar are those between the aircraft and the target or reference point (slant range) and not the ground range between the projection of the aircraft on the earth and the target or reference point. As a result, when this slant range information is utilized as the input to the radar presentation, targets at short ground ranges are shown too close together, while targets at increasing distant ground ranges appear to approach an undistorted display. In order that a radar presentation be provided where the corresponding distances between objects are not distorted, it is necessary that the slant range radar information be displayed in appropriate ground range co-ordinates. As suggested above, the relationship between any particular slant range and its corresponding ground range quantity is hyperbolic in nature.

One type of radar presentation is known as a Plan Position Indicator (P.P.I.) wherein an electron beam emanating within a cathode ray tube is successively swept radially outward from a predetermined point on the cathode ray tube screen while the direction of each successive beam sweep is being rotated through a complete circle or scanned back and forth through a sector thereof. Another type of radar presentation is provided by the movement of an electron beam across the screen of a cathode ray tube by co-ordinated X and Y sweeps where the Y sweep traversal of the electron beam across the screen is co-ordinated with the time required for the transmitted electromagnetic energy pulses to travel to and from the target or reference point. In either of these types of radar presentation the cathode ray beam is intensified on the receipt of the reradiated pulses from the target or reference point to cause the appearance of a luminous spot in a position on the face of the screen corresponding to the range being presented.

According to the prior art, in order that the map-like presentation be provided, the instantaneous voltages commensurate with slant range sweep have been converted to corresponding instantaneous voltages commensurate with ground range sweep prior to their presentation on radar indicators of the type described above by synthesizing an electronic transfer function which approximately corresponds to the hyperbolic relation therebetween.

More specifically, one technique of the prior art has been to utilize a R-C network to reproduce this hyperbolic relationship from the conventional saw-tooth voltage versus time relationship often utilized to sweep the electron beam across the cathode ray screen from the origin in accordance with the slant range voltage sweep. For example, several R-C parameter combinations may be utilized to combine the exponential charging curves of each, with the saw-tooth voltage such that the output waveform from the network may have a voltage versus time characteristic which is approximately hyperbolic in shape.

Another technique of the prior art has been to compute the ground range as a dependent variable from an independent variable commensurate with slant range by mechanizing the following equation:

$$R_g = \sqrt{R_s^2 - h^2} \qquad (1)$$

where $R_g$=instantaneous ground range being searched by the electromagnetic energy pulses
$R_s$=instantaneous slant range being searched by the electromagnetic energy pulses, and
$h$=instantaneous altitude of the aircraft carrying the airborne radar.

However, a direct mechanization of equation (1) which would provide an accurate solution utilizing prior art techniques is difficult by reason of the fact that even though quantities commensurate with the instantaneous slant range ($R_s$) being searched by the airborne radar and the altitude ($h$) of the aircraft in which it is mounted are provided, no means are known whereby the squared quantities $R_s^2$ and $h^2$ may be derived therefrom with a high degree of accuracy while at the same time providing the necessary band pass (response time) required for the sweep circuits of airborne radar. Moreover, means are not known which would give the square root of the quantity $$\sqrt{R_s^2 - h^2}$$

with the desired accuracy and time response needed in radar sweep circuits.

While the prior art has recognized the need for the solution of this critical scaling problem for accurate radar presentation in navigation and bombing systems, the means utilized for providing the desired hyperbolic relationship between the slant range voltage sweep, as an independent variable, and the ground range voltage sweep, as a dependent variable, has been relatively inaccurate and, therefore, generally unsatisfactory. Accordingly, the teachings of the present invention provide more accurate means for deriving this critical hyperbolic relationship in a manner which may well be used to derive a voltage commensurate with the base of any right triangle when voltages commensurate with the hypotenuse and altitude are known.

Aside from the problems associated with deriving an accurate hyperbolic waveform commensurate with the ground range voltage sweep input for an airborne radar presentation from a saw-tooth waveform commensurate with the slant range voltage weep referred to above, additional problems exist in assuring that the actual ground range sweep in the presentation means is hyperbolic inasmuch as the sweep circuits utilized are reactive and are partially non-responsive to the large rate of change of the leading edge of the hyperbolic voltage waveform. These reactive sweep circuits may be of several types. One exemplary type in use is the electromechanical resolver which comprises a rotor positioned in accordance with the position of a directional antenna and a stator winding energized by the desired sweep voltage. In addition, two windings on the rotor, displaced by 90 degrees, are utilized to energize the co-ordinate deflection means of the electronic beam of a P.P.I. presentation. These co-ordinate deflection means may be either a vertical and horizontal electromagnetic deflection coil or vertical and horizontal sets of electrostatic deflection plates. Another exemplary type is where only one deflection coil or set of deflection plates is used and the sweep voltage is applied directly thereto as in the case of the "side looking airborne radar."

In the past, designers often tried to overcome the problems arising from the reactive character of the electromagnetic resolver described above by energizing the stator winding with the approximately hyperbolic waveform derived according to the known methods described above via a negative feedback amplifier. The feedback voltage was then taken from a winding which is known as a compensator winding positioned on the stator in close proximity to the stator winding and applied in a degenerative manner to the input of the feedback amplifier. In this way, the reactive nature of the resolver could be minimized.

The present invention utilizes a negative feedback amplifier including a gate in the output of the amplifier to provide an exceedingly accurate hyperbolic voltage waveform in its output which is commensurate with an accurate ground range voltage sweep when the amplifier is receiving an input commensurate with the corresponding slant range voltage sweep. Inasmuch as a negative feedback amplifier technique is utilized to derive the desired hyperbolic voltage sweep, the technique of the present invention has the added advantage that a further negative feedback amplifier is unnecessary for the limited purpose of correcting for the reactive nature of the sweep circuit. An additional feature of the technique of the present invention arises from the fact that the voltage applied to the reactive sweep circuit on the closing of the gate is initially high rather than being forced to rise from an initial zero condition as would be the case if the prior art techniques described above were utilized. Moreover, means are provided in the feedback loop of the present invention where a further adjustment may be made for the reactive nature of the sweep circuit so that the driving waveform of the sweep applied to the electron beam of the airborne radar presentation may be a true hyperbola, whether it is desired that it be a voltage or current waveform.

It is, therefore, a primary object of the present invention to provide new and improved means for electronically solving a right triangle.

It is another object of the present invention to provide new and improved means for accurately deriving an electrical quantity commensurate with one side of a right triangle when the magnitude of the hypotenuse and the magnitude of the other side are known.

It is an additional object of the present invention to provide new and improved means for converting a saw-tooth waveform into an hyperbolic waveform.

It is still another object of the present invention to provide new and improved means for deriving an accurate electrical quantity commensurate with ground range from known voltages commensurate with slant range and altitude.

It is another object of the present invention to provide new and improved means for providing a composite indication of successive ranges by an airborne radar with a map-like presentation where the correct ground distances between objects (targets and/or reference points) are maintained.

It is an additional object of the present invention to provide a new and improved means for applying a hyperbolic voltage waveform to the reactive sweep circuits of cathode ray tubes.

Other objects of the invention will in part be obvious and will in part appear hereinafter.

Other objects of the invention will be pointed out in the following description and claims and illustrated in the accompanying drawings, which disclose, by way of examples, the principle of the invention and the best mode, which has been contemplated, of applying that principle.

Figure 4:
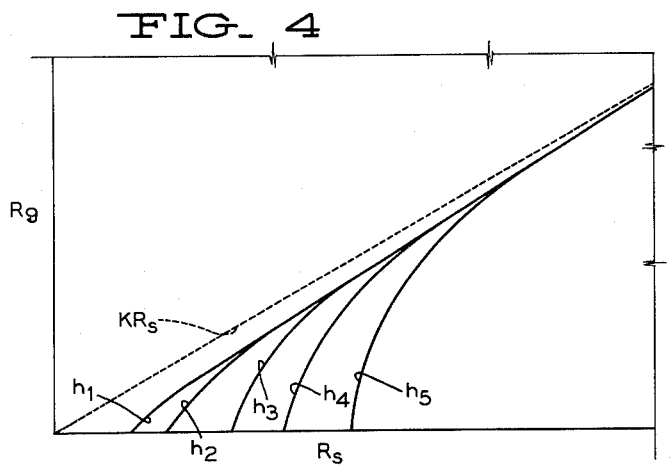
Figure 3:
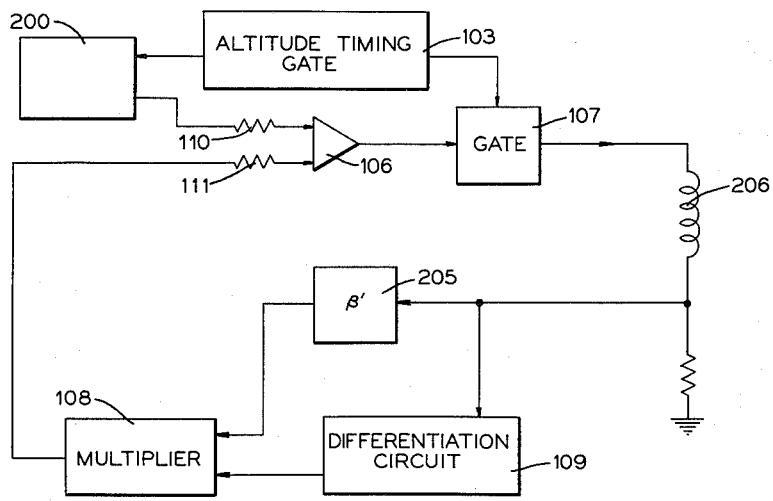

FIG. 3 shows in block diagram form an electrical system for deriving an electrical waveform output according to the teachings of the present invention when a deflection coil of a single axis deflection system is included therein; and FIG. 4 graphically illustrates a family of hyperbolic waveforms being derived according to the present invention which is commensurate with a desired ground range sweep voltage and the instantaneous magnitude of the base of the right triangular waveform of a linear saw-tooth voltage.

As indicated above, one of the engineering applications to which the present invention may have particular utility is in the derivation of the hyperbolic relationship between the instantaneous slant range sweep $R_s$ of an airborne radar system and an instantaneous ground range sweep $R_g$ which may be used in a radar indicator to provide a composite map-like presentation of a search sector. Briefly, the present invention comprises means for inserting a reference slant range voltage sweep into a summing amplifier with electronic gating means responsive to the output thereof which is closed until the time required for an electromagnetic pulse from airborne radar to reach the ground directly beneath the aircraft and return for each slant range voltage sweep. Further, an electronic multiplying means is connected directly to the output of said gating means via one path and via a differentiation means along another path such that the multiplying means may provide a feedback voltage commensurate with their product to the input of the above-mentioned summing amplifying means. As a result of such a combination, the feedback voltage may be such as to be equal and opposite in polarity to said slant range voltage sweep resulting in a gated output voltage which is hyperbolic in waveform.

FIG. 4 shows a plot of a family of curves representing the ground range sweep $R_g$ versus the slant range sweep $R_s$ for several representative altitudes at which the aircraft mounting the airborne radar might fly. Later in the description it will be obvious that $h_1$, $h_2$, $h_3$, $h_4$, and $h_5$ represent increasing altitudes. As suggested by the discussion set forth above and an inspection of Equation 1, this relationship is hyperbolic in nature and asymptotically approaches a straight line represented by a dotted line with increasing values of slant range $R_s$. As will be seen from the discussion set forth below, the dotted line may also be mechanized as representing the waveform of a constant K times a linear saw-tooth voltage which may in turn be calibrated to represent the slant range sweep voltage of an airborne radar.

As may be recalled from the above discussion, information from an airborne radar is received as a function of the time it is required for pulses of energy to strike the target and return in a straight line to the aircraft. If a linear sweep of a cathode ray tube is started at the time the pulse is transmitted and the sweep intensified as a function of the time of receipt of reradiated energy, a slant range display on the face of a cathode ray tube will result. In this display there will be a distance from the start of the sweep corresponding to the altitude of the aircraft in which there cannot be any ground targets or navigational points. Generally, airborne radar has utilized blanking techniques which render the display inoperative during that portion of the slant range sweep voltage. However, targets at slant ranges greater than the altitude of the aircraft mounting the airborne radar will be represented by appropriate intensifications of the sweep or portions thereof not blanked out. Further, as indicated above, a radar display of this type makes it difficult to locate the target inasmuch as a "picture" of the ground with slant range sweep does not look as a map of the area should look. For example, equally spaced ground targets in the immediate area beneath the aircraft appear closer together and will only approach their true spacing at long slant ranges represented by the hyperbolic relationship approaching the straight line at increasing values of slant range, as seen in FIG. 4. To provide a ground range voltage sweep $R_g$, it is necessary to withhold the sweep until a ground return corresponding to the altitude of the aircraft is received, and then move the sweep quickly to "expand" the returns from targets almost under the aircraft and slowly approach the linear sweep for increasing slant ranges as represented by the dotted line in FIG. 4. Such a relationship between the desired ground range voltage sweep and the slant range voltage sweep generated by a calibrated conventional linear saw-tooth is represented by Equation 1 set forth above. Thus, the present invention provides improved means for deriving a ground range voltage sweep $R_g$ from the conventional accurately derived slant range voltage sweep $R_s$ according to Equation 1. A voltage commensurate with the ground range voltage sweep $R_g$ may then provide an input to the conventional radar presentation indicated above resulting in a map-like presentation of targets and navigation reference points.

The present invention may be more easily understood by reference to the following mathematical operations of Equation 1. For example, both sides of Equation 1 may be squared thereby deriving Equation 2.

$$R_g^2 = R_s^2 - h^2 \tag{2}$$

If the derivative with respect to time of Equation 2 is taken, Equation 3 results.

$$2R_g \frac{dR_g}{dt} = 2R_s \frac{dR_s}{dt} - 2h \frac{dh}{dt} \tag{3}$$

It may be assumed that the altitude of the aircraft mounting the radar remains constant at least for the time required for one voltage sweep. Therefore, $$\frac{dh}{dt} = 0$$

and the term $$2h \frac{dh}{dt} = 0$$

Moreover, since the slant range sweep voltage $R_s$ may be derived by a linear saw-tooth voltage, its slope $$\frac{dR_s}{dt}$$

is equal to a constant K known as a range scale factor.

On the making of appropriate substitutions and the cancellation of the common factor of 2, Equation 3 becomes $$R_g \frac{dR_g}{dt} = KR_s \tag{4}$$

Equation 4 may be rather easily solved by direct computational techniques in contrast with the original Equation 1 by using a feed-back loop technique providing the equation is rearranged as shown in Equation 5 below.

$$R_g \frac{dR_g}{dt} - KR_s = 0 \tag{5}$$

It should be noted, however, that the effect of altitude has been lost by reason of the squaring and differentiation steps utilized above and must be replaced in any accurate mechanization of Equation 5. This may be done by the knowledge of the boundary condition suggested above that the ground range sweep $R_g$ must be zero for any time less than the time corresponding to the time required for electromagnetic pulse energy from the radar to reach the ground beneath the aircraft and return, hereinafter known as "altitude time." To meet this boundary condition we may, therefore, gate the computing means such that the ground range voltage sweep $R_g$ will be zero during the "altitude time."

Figure 1:
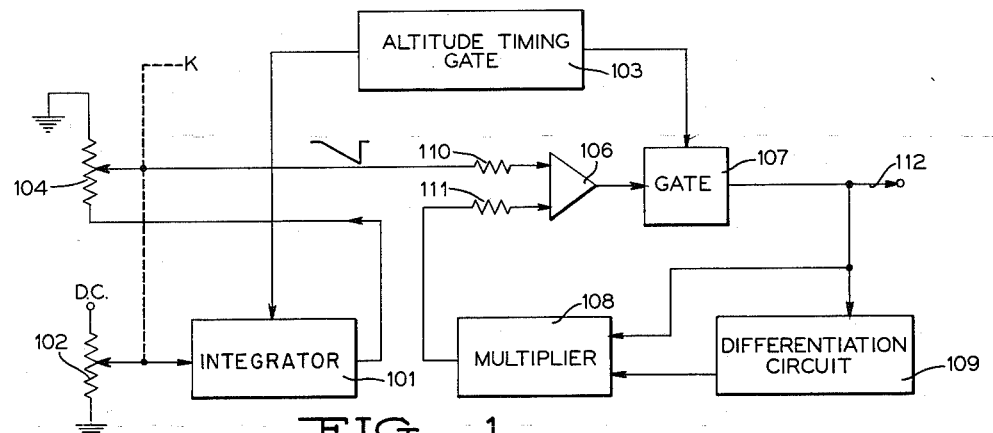
FIG. 1 shows in block diagram form an electrical system for providing a desired electrical waveform output according to the teachings of the present invention.

FIG. 1 shows a block diagram illustrating an exemplary embodiment of the present invention comprising a mechanization of Equation 5 including means for considering the variable boundary condition represented by "altitude time." Referring now to FIG. 1, an integrator 101 may be utilized to derive a linear saw-tooth voltage commensurate with a slant range sweep voltage appropriate to the particular range being searched by the airborne radar. The linear saw-tooth voltage may be calibrated according to the appropriate slant range sweep voltage by selecting the magnitude of the input voltage derived on potentiometer 102. Potentiometer 102 is energized at one terminal by a reference D.C. supply voltage and grounded at the other terminal. The wiper of potentiometer 102 is positioned in accordance with the calibration constant K. In order to provide a time reference, the integrated output from 101 is triggered to commence at time equal zero by the action of altitude timing gate 103 on the integrator. Both integrator 101 and gate 103 are conventional circuit components well known in the arts and may comprise any of several well known types of timing gates and saw-tooth generators, respectively. For example, a saw-tooth generator may be exemplified by the bootstrap type which is described in detail in FIG. 7.15 on pages 267–278 of the Radiation Laboratories Series, volume 19, entitled "Waveforms" by Chance et al. Timing gate 103 will be discussed in more detail hereinafter.

The output of integrator 101 is then equal to the slant range voltage sweep $R_s$ and may be applied to energize potentiometer 104 at one terminal such that the voltage on its wiper, which is positioned in accordance with scaling constant K, is equal to a voltage commensurate with $KR_s$ and applied through a summing resistor 110 to amplifier 106. The output from amplifier 106 may then be gated by gate 107. Gate 107 is in turn responsive to timing gate 103 so that it is closed during the "altitude time" portion of the slant range voltage sweep and open during the remaining slant range sweep time. As indicated above, timing gate 103 may be any of a number of conventional circuits which, by way of example, transmits an initiating pulse to the integrator 101 at the beginning of each slant range sweep time and a positive pulse to gate 107, the width of said positive pulse being equal to "altitude time." The phanastron circuit, shown in FIG. 7.32 and described on pages 287 and 288 of the Radiation Laboratories Series, volume 19 identified above, is an example of the type of known circuitry which will perform the functions of timing gate 103. Also gate 107 may be exemplified by the type shown in FIG. 10.8 and described on page 372 of the same volume.

Moreover, if the output from gate 107 is divided into two paths, an input may be applied directly to an electronic multiplier 108 by one path and to a differentiation circuit 109 by the other path. The output of the differentiation circuit 109 may then be applied to multiplier 108 which provides at its output a voltage commensurate with the product of the gate output voltage times the derivative of gate output voltage. The product output voltage of the multiplier may then be applied through resistor 111 as a second input to summing amplifier 106, thereby closing the feedback loop. Since the action of the summing amplifier in the negative feedback loop is to tend to drive its two input voltages to be equal in magnitude and opposite in polarity, it follows from an inspection of Equation 5, which the foregoing mechanization solves, that the gate output voltage at terminal 112 is equal to the ground range voltage sweep $R_g$ and the differentiation circuit output voltage is equal to the ground range sweep voltage differentiated with respect to time $$\frac{dR_g}{dt}$$

Differentiation circuit 109 may be of several well known types. For example, it may be a well known feedback differentiating amplifier. Multiplier 108 may be one of several known electronic multipliers having the desired frequency response to react to the fast rise time in the leading edge of the ground range voltage sweep waveform. It should be noted from FIG. 4 that the rise time on the leading edge of the ground range sweep voltage waveform increases with increased altitudes or larger altitude times. One multiplier that will satisfy these requirements is known as model 4R2 manufactured by the Industrial Test Equipment Company, 55 East 11th Street, New York 3, New York.

In order that the present invention be more clearly understood, it is emphasized that if gate 107 were not in the circuit or open at all times, the second input voltage applied to summing resistor 111 would be equal to the first input voltage $KR_s$ which is supplied to summing resistor 110 in a manner which is common to feedback amplifier design. Such a situation would arise when either the boundary conditions incident to the mechanization of Equation 5 were not considered or when the aircraft in which the radar is mounted is on the ground and the slant range is equal to the ground range. During this condition, the input voltages to multiplier 108 directly from output terminal 112 and differentiating circuit 109 are commensurate with $R_s$ and K, respectively. However, if the boundary conditions of Equation 5 are considered and the aircraft in which the radar is mounted is at a particular altitude above ground, the gate 107 will be closed commencing on the initiation of the slant range voltage sweep $R_s$ for a period equal to "altitude time" which was defined above as corresponding to the time required for electromagnetic pulse energy from the radar to reach the ground beneath the aircraft and return. Meanwhile, a rising linear saw-tooth voltage commensurate with the quantity $KR_s$ is being applied by a summing resistor 110 to output amplifier 106. Since the gate 107 is closed, feedback summing resistor 111 has no voltage applied thereon. However, after the elapse of "altitude time" a step voltage is applied to the output terminal 112 and through the feedback paths to the input of multiplier 108 such that the voltage applied to summing resistor 111 instantaneously balances the voltage commensurate with $KR_s$ applied to summing resistor 110. The differentiation circuit 109 senses this step voltage and assures that the balancing voltage applied to summing resistor 111 is appropriately large.

Referring to FIG. 4 it will be noted that the dotted line represents the instantaneous input voltage to amplifier 106, commensurate with $KR_s$, while any one of the family of hyperbolic waveforms represents the voltage rise at output terminal 112 upon opening of the gate 107 at "altitude time." Since the instantaneous quantities voltages summed in the input of amplifier 106 need be equal, it will be obvious that the vertical distances between any point on any of the hyperbolic plots and a corresponding point on the dotted line representing the instantaneous input voltage $KR_s$ applied to summing resistor 110 is representative of the contribution to the product output voltage of multiplier 108 made by differentiating circuit 109 sensing the rate of change in the voltage at output terminal 112. Stated another way, the instantaneous output of the differentiating circuit 109 represents the ratio of the instantaneous input voltage $KR_s$ applied to the summing resistor 110 with respect to the instantaneous voltage $R_g$ at output terminal 112.

Since the circuitry shown in FIG. 1 solves Equation 5, the voltage at output terminal 112 will be equal to $R_g$, the instantaneous ground range sweep voltage. Moreover, as the altitude of the aircraft in which the airborne radar is mounted increases, the input voltage level to amplifier 106 present immediately prior to the end of "altitude time" also increases as a result of the fact that the voltage applied to summing resistor 110 increases linearly with time, and the voltage applied to summing resistor 111 is maintained at zero by closed gate 107. Therefore, at the end of "altitude time," when gate 107 opens, a larger voltage is applied to terminal 112, resulting in a steeper slope in the ground range voltage sweep $R_g$. This is illustrated by the family of hyperbolic plots shown in FIG. 4. No attempt has been made to give an accurate scalar variation of these hyperbolic plots representing ground range sweep voltage as they each vary with respect to the altitude of the aircraft and the slant range sweep voltage $R_s$. It should be noted that $h_1$, $h_2$, $h_3$, $h_4$, and $h_5$ are progressively greater altitudes for the aircraft. It may also be noted that in the limit, $R_g$ will approach $R_s$ and the rate of change of $R_g$ with time will approach the constant K. It is emphasized that it is an important aspect of the present invention that the output voltage from gate 107 is high at the time that it is open, thereby resulting in a faster rise time in the leading edge of the hyperbolic waveform being generated.

The use of a feedback circuit according to the teachings of the present invention provides several advantages not accruing to the prior art. Aside from the problems associated with deriving an accurate hyperbolic waveform commensurate with the ground sweep voltage input for an airborne radar presentation from a saw-tooth waveform commensurate with the slant range voltage sweep referred to, additional problems exist in assuring that the actual ground range voltage sweep in a presentation means is hyperbolic inasmuch as the sweep circuits utilized are reactive and are partially non-responsive to the large rate of change of the leading edge of a hyperbolic voltage waveform. In general deflection circuits in cathode ray tube type displays are of two types. One is known as electrostatic, often using a pair or pairs of deflection plates on which a desired ground range sweep may be applied in the form of a hyperbolic voltage waveform. In this type it is desirable that the ground range voltage sweep waveform be accurately hyperbolic. This is to be distinguished from other types of deflection circuits usable for a ground range display known as the electromagnetic deflection type utilizing one or more deflection coils where it is important that current passing through the coil have a hyperbolic waveform commencing at "altitude time." The waveform of the voltage applied thereacross must be such that said accurate hyperbolic current waveform is produced.

Figure 2:
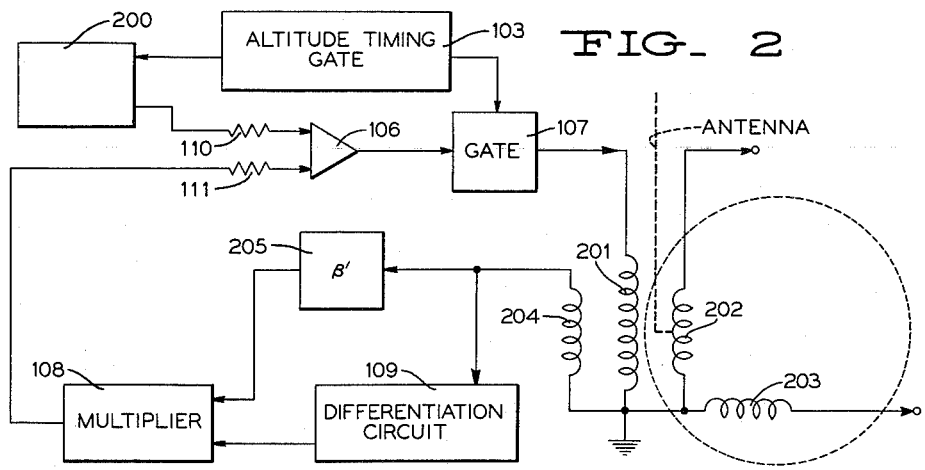
FIG. 2 shows in block diagram form an electrical system for deriving an electrical waveform output according to the teachings of the present invention when an electromechanical resolver and compensating winding for providing rectangular co-ordinate sweeps is included therein.

The prior art has often tried to overcome the problems arising from the reactive character of the sweep circuits used by energizing a portion thereof from the approximately hyperbolic waveform derived according to the known methods described above via a negative feedback amplifier where a portion of the reactive sweep circuit means is included in a negative feedback loop. This technique has been utilized by the prior art when it is either the voltage waveform which must be accurately hyperbolic or alternatively when the current waveform is required to be accurately hyperbolic. This same technique may be utilized in the present invention by connecting the reactive sweep circuit, or a portion thereof, directly into the feedback circuit prior to the point which serves as an input to the differentiation circuit. Since the present invention utilizes a negative feedback amplifier including a gate, differentiation circuit and multiplier in a manner described above in connection with FIG. 1 to provide an exceedingly accurate hyperbolic waveform as output, it is an important advantage of the present invention that a further negative feedback amplifier for the limited purpose of correcting for the reactive nature of the sweep circuit is often unnecessary. FIG. 2 illustrates an incorporation of the reactive portions of a sweep circuit in combination with the utilization of the feedback techniques of the present invention.

FIG. 2 illustrates the technique of inserting a portion of the electrical mechanical resolver often used in radar sweep circuits into this feedback circuit. Therein block 200 illustrates the portion of FIG. 1 deriving the linear saw-tooth voltage commensurate with $KR_s$ in FIG. 1. Block 200 may be considered as including potentiometers 102, 104 and integrator 101. It should be noted that identical components performing the same functions appearing in FIGS. 1, 2 and 3 will be identified with the same number. Thus, a voltage commensurate with $KR_s$ is applied through summing resistor 110 to amplifier 106. Moreover, the output of amplifier 106 is applied to gate 107 which, as in FIG. 1, is closed during the portion of the slant range sweep voltage input which is equal to "altitude time." The output voltage voltage from gate 107 may then be connected to the stator winding 201 of the airborne antenna resolver being positioned in accordance with the direction of the antenna as shown. Thus, the output voltage commensurate with the ground range sweep voltage may be applied inductively to rotor windings 202 and 203 which are disposed at 90 degrees with respect to one another to provide a resolution of the ground range sweep voltage to the horizontal and vertical deflecting means of a radar presentation. Inasmuch as the resolver circuitry set forth is reactive, the forward path of the feedback amplifier is reactive having the effect of rendering the actual ground range sweep voltage something other than hyperbolic because of the inability of the reactive circuit to transmit the fast rise time of the hyperbolic voltage waveform. In order to overcome this problem and several others with which the present invention is not concerned, it is well known to incorporate a compensating winding 204 wound adjacent winding 201 on the stator such that the reactive character of windings 201 and 204 tend to be modified. As shown, one terminal of the windings 201, 202, 203, and 204 may be conveniently grounded at a common terminal. The output from the compensating winding may be applied directly to the multiplier 108 and differentiating circuit 109 such that the product of the voltage appearing at the output of the compensator winding 204 and a voltage commensurate with its rate of change with respect to time may be applied to summing resistor 111 in the same manner as set forth above in connection with FIG. 1. With gate 107 being closed until "altitude time" and the slant range search voltage being applied to summing amplifier 106, a voltage commensurate with the hyperbolic ground range sweep voltage $R_g$ will appear across the rotor windings 202—203 providing the reactive character of the sweep circuits are completely compensated for.

As a matter of practice, however, the action of the compensator winding is insufficient to nullify the inductive effects or resolver windings. Moreover, many sweep circuit techniques utilize means beyond the resolver which are reactive in character with the result that additional means in the form of feedback amplifiers are utilized to overcome this problem. As is well known in the electrical arts, the ratio of the output voltage to input voltage of feedback amplifier may be represented by the following generalized equation:

$$\frac{E_0}{E_i} = \frac{G}{1+G\beta} \quad (6)$$

where $G$ = the open loop gain of the feedback amplifier which is usually designed to be very high,
$\beta$ = proportion of the output fed back to the input of the amplifier through the feedback
$E_0$ representing the output voltage; and
$E_i$ representing the input voltage.

Where the gain G of the amplifier may be considered high it is a good approximation to consider that the Equation 6 may be reduced to $$\frac{E_0}{E_i} \approx \frac{1}{\beta} \quad (7)$$

Thus, in feedback amplifier techniques the output voltage may be modified by the selection of the $\beta$ of the feedback circuit. FIG. 2 illustrates the manner in which this may be done. Reference may be made to chapter 6, pages 170–179 of a textbook entitled, Active Networks, Vincent C. Rideout, Prentice-Hall Incorporated, New York, 1954, for a discussion of the well-known advantages of negative feedback amplifiers.

As may be observed, the $\beta$ of the feedback network of FIG. 2 has to be determined by the total effect of the components contained in the feedback network such as the differentiation circuit 107, block 205 (the content of which will be discussed below) and multiplier 108. Referring to Equation 7 it will be clear that if it is the desire that the output voltage from gate 107 of FIG. 2 be hyperbolic with respect to the triangular voltage waveform input voltage to amplifier 106, commencing after the passage of "altitude time," that the quantity $$\frac{1}{\beta}$$

has to reflect this relationship also. Thus, it will be clear that the alteration of any of the aforementioned components in the feedback network may be utilized to modify this relationship as desired. For example, if the net effect of the rotor windings 202—203 and compensator winding 204 were to alter this hyperbolic relationship represented by an appropriate $$\frac{1}{\beta}$$

ratio, the negative feedback relationship represented by the approximate Equation 7 may be modified by the proper selection and insertion of circuitry in block 205 inserted between the compensator winding 204 and the input of multiplier 108 such that the voltage output waveform is truly hyperbolic. Block 205 might well be characterized as a $\beta'$ network because of its relationship with the selection of the desired $\beta$ of the feedback circuit. The selection of the proper circuitry to be contained in block 205 may be made according to the particular design and $\beta'$ action desired.

In those instances where it is desired that the current waveform in the sweep circuitry be hyperbolic rather than the voltage across the sweep circuit means, the content of block 205 representing $\beta'$ may be appropriately modified until such is the case. In those cases, the voltage output waveform would undoubtedly be something other than hyperbolic. Such a requirement may exist in FIG. 3 which shows the circuitry of FIG. 2 modified to incorporate a single deflection coil in the feedback in place of the resolver stator winding and compensator winding of FIG. 2. Therein the circuitry incorporated within block 205 would provide a $\beta'$ which would provide a hyperbolic current waveform in deflection coil 206. A single deflection coil is often used in "side looking" airborne radar.

It is emphasized that the present invention does not teach the advantages inherent in negative feedback amplifiers and represented by Equation 7 above, but does teach a computational technique, for deriving a ground range sweep which is hyperbolic in form, which utilizes the negative feedback technique. However, because the teachings of the present invention utilize a negative feedback technique, the inherent advantages of the negative feedback amplifier may be used for correcting for the reactive nature of the forward loop in accordance with the prior art without the addition of a negative feedback amplifier stage. The selection of the network to be contained in block 205 of FIGS. 2 and 3 is a matter for the particular design. By way of example, reference may be had to the many stabilizing networks shown in charts 4.2–1, 4.2–2, 4.2–3, 4.2–4, 4.2–5 and 4.2–6 appearing on pages 120 through 135 of Servomechanisms and Regulating Systems Design, volume II by Chestnut, et al., published by John Wiley & Sons, Inc., New York, 1955.

Numerous minor modifications may be made in the circuitry shown in FIGS. 1, 2 and 3 within the teachings of the present invention. For example, gate 107 might well be located in the input of summing amplifier 106. Another modification might deal with the location of the $\beta'$ network in the feedback loop. For example, the $\beta'$ network might be placed in the differentiating path in the output of multiplier 108 or in the feedback loop prior to a separation into the two paths shown. Thus it may be seen that the teachings of the present invention extend to the many circuit arrangements which would solve Equation 5 and consider its important boundary conditions.

While there have been shown and described and pointed out the fundamental novel features of the invention as applied to preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A hyperbolic waveform generating means for deriving a voltage commensurate with the ground range sweep voltage input to an airborne radar presentation comprising means for deriving a linear saw-tooth voltage commensurate with the slant range voltage sweep input to an airborne radar presentation, summing means responsive to said slant range sweep voltage, electronic gating means connected to the output of said summing means for providing a gated output voltage, said gating means including a gate pulse deriving means which functions to close said gate during altitude time for each slant range voltage sweep, differentiating means responsive to said gated output voltage for deriving a voltage commensurate with the derivative thereof, electronic multiplying means responsive to said gated output voltage and said differentiated voltage for providing a feedback voltage commensurate with their product, said feedback voltage being summed in said summing means in a manner so as to tend to be equal and opposite in polarity to said slant range voltage sweep, said gated output voltage being hyperbolic in waveform and commensurate with the ground range voltage sweep input to an airborne radar presentation.

2. A hyperbolic waveform generating means for deriving a voltage commensurate with the ground range sweep voltage input to an airborne radar presentation comprising means for deriving a linear saw-tooth voltage commensurate with the slant range search voltage sweep input to an airborne radar presentation, summing means responsive to said slant range sweep voltage, electronic amplifying and gating means connected to the output of said summing means for providing a gated amplifier output voltage, said gating means including a gate pulse deriving means which functions to close said gate during altitude time for each slant range voltage sweep, differentiating means responsive to said gated output voltage for deriving a voltage commensurate with the derivative thereof, electronic multiplying means responsive to said gated amplifier output voltage and said differentiated voltage for providing a feedback voltage commensurate with their product, said feedback voltage being summed in said summing means in a manner so as to tend to be equal and opposite in polarity to said slant range voltage sweep, said gated output voltage being hyperbolic in waveform and commensurate with the ground range voltage sweep input to an airborne radar presentation.

3. A hyperbolic waveform generating means for deriving an electrical quantity commensurate with the ground range sweep input to an airborne radar presentation comprising means for deriving a linear saw-tooth voltage commensurate with the slant range search voltage sweep input to an airborne radar presentation, summing means responsive to said slant range sweep voltage, electronic gating means connected to the output of said summing means for providing a gated output voltage, said gating means including a gate pulse deriving means which functions to close said gate during altitude time for each slant range voltage sweep, deflection driving means connected to be responsive to said gated output voltage, differentiating means responsive to the voltage applied to said deflection driving means for deriving a voltage commensurate with its derivative, electronic multiplying means responsive to the voltage applied to said deflection driving means and said differentiated voltage for providing a feedback voltage commensurate with their product, said feedback voltage being summed in said summing means in a manner so as to tend to be equal in magnitude and opposite in polarity to said slant range voltage sweep, said input quantity to said deflecting driving means being of a hyperbolic waveform and commensurate with the ground range sweep of an airborne radar presentation.

4. The hyperbolic waveform generating means of claim 3 wherein said deflection driving means comprises a single deflection coil.

5. A hyperbolic waveform generating means as set forth in claim 3 wherein said deflection driving means comprises an electromechanical resolver providing rectangular co-ordinate voltage sweeps comprising said electromechanical resolver including a compensator winding.

6. A right triangle waveform generating means for deriving a voltage commensurate with the instantaneous magnitude of the base of said right triangle comprising means for deriving a linear saw-tooth voltage sweep commensurate with said instantaneous right triangular waveform, summing means responsive to said linear saw-tooth voltage, electronic gating means connected to the output of said summing means for providing a gated output voltage, said gating means including a gate pulse deriving means which functions to close said gating means for a time period during each linear saw-tooth voltage commensurate with the instantaneous altitude of said right triangle, differentiating means responsive to said gated output voltage for deriving a voltage commensurate with the derivative of said gated output voltage, electronic multiplying means responsive to said gated output voltage and said differentiated gated output voltage for providing a feedback voltage with their product, said feedback voltage being summed in said summing means in a manner so as to tend to be equal in magnitude and opposite in polarity to said linear saw-tooth voltage, said gated output voltage being commensurate with the instantaneous magnitude of the base of said right triangle.

7. A hyperbolic waveform generating means for deriving a voltage commensurate with the instantaneous base of a right triangular waveform comprising means for deriving a linear saw-tooth voltage providing a reference right triangular waveform, summing means responsive to said instantaneous linear saw-tooth voltage, electronic gating means connected to the output of said summing means for providing a gated output voltage, said gating means including a gate pulse deriving means which functions to close said gate for a time period during each linear saw-tooth voltage commensurate with the instantaneous altitude of said right triangle, differentiating means responsive to said gated output voltage for deriving a voltage commensurate with the derivative of said gated output voltage, electronic multiplying means responsive to said gated output voltage and said differentiated output voltage for providing a feedback voltage commensurate with their product, said feedback voltage being summed in said summing means in a manner such as to tend to be instantaneously equal in magnitude and opposite in polarity to said linear saw-tooth voltage, said gated output voltage having a hyperbolic waveform.

8. A hyperbolic waveform generating means for deriving an electrical quantity commensurate with the ground range sweep input to an airborne radar presentation comprising means for deriving a linear saw-tooth voltage commensurate with the slant range voltage sweep input to an airborne radar presentation, a summing amplifier means including a gating means responsive to said slant range sweep voltage providing a gated output electrical quantity, said gating means including a gate pulse deriving means which functions to close said gate during altitude time for each slant range voltage sweep, differentiating means responsive to the voltage output of said amplifying and gating means for deriving a voltage commensurate with the derivative of said gated amplifier output electrical quantity, electronic multiplying means responsive to said gated amplifier output electrical quantity and said differentiated voltage for providing a feedback voltage commensurate with their product, said feedback voltage being summed in said summing means in a manner so as to tend to be equal and opposite in polarity to said slant range voltage sweep, said gated amplifier electrical output quantity being hyperbolic in waveform and commensurate with the ground range sweep input to an airborne radar presentation.

9. The hyperbolic waveform generating means of claim 8 where further electrical circuitry is inserted in the feedback path to correct for the reactive nature of the sweep circuits of said airborne radar presentation means.

10. A hyperbolic waveform generating means for deriving an electrical quantity commensurate with the ground range sweep input to an airborne radar presentation comprising means for deriving a linear saw-tooth voltage commensurate with the slant range voltage sweep input to an airborne radar presentation, summing means responsive to said slant range sweep voltage, electronic gated amplifier means responsive to said summing means output for providing a gated electrical quantity output, said gated amplifier means including a gate pulse deriving means which functions to close said gate during altitude time for each slant range sweep voltage, a single deflection coil, one terminal of which is connected to the output of said gated amplifier means, differentiating means connected to the other terminal of said single deflection coil for deriving a voltage commensurate with the derivative of the gated electrical quantity output, electronic multiplying means responsive to said gated electrical quantity output and said differentiated voltage output for providing a feedback voltage commensurate with their product, further electrical circuitry inserted in said feedback path to correct for the reactive nature of said deflection coil, said feedback voltage being summed in said summing means in a manner so as to tend to be qual and opposite in polarity to said slant range voltage sweep, said gated electrical quantity output being hyperbolic in waveform and commensurate with the ground range sweep input to an airborne radar presentation.

References Cited in the file of this patent
UNITED STATES PATENTS

| | | |
|---|---|---|
| 2,506,770 | Braden | May 9, 1950 |
| 2,557,691 | Rieber | June 19, 1951 |
| 2,611,126 | Irving | Sept. 16, 1952 |
| 2,815,169 | McKenney et al. | Dec. 3, 1957 |
| 2,938,671 | Strom | May 31, 1960 |

OTHER REFERENCES

Chance et al.: Waveforms, McGraw-Hill, New York (1949), pages 301–305.